United States Patent
Liu

(10) Patent No.: US 9,876,384 B2
(45) Date of Patent: Jan. 23, 2018

(54) CHARGING DEVICE AND CHARGING METHOD

(71) Applicant: ZTE Corporation, Shenzhen, Guangdong (CN)

(72) Inventor: Kejing Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 144 days.

(21) Appl. No.: 14/891,444

(22) PCT Filed: Aug. 9, 2013

(86) PCT No.: PCT/CN2013/081230
§ 371 (c)(1),
(2) Date: Nov. 16, 2015

(87) PCT Pub. No.: WO2013/189327
PCT Pub. Date: Dec. 27, 2013

(65) Prior Publication Data
US 2016/0126773 A1      May 5, 2016

(30) Foreign Application Priority Data
May 16, 2013   (CN) .......................... 2013 1 0181894

(51) Int. Cl.
*H02J 7/02*     (2016.01)
*H02J 7/04*     (2006.01)
(Continued)

(52) U.S. Cl.
CPC ............. *H02J 7/025* (2013.01); *H02M 3/155* (2013.01); *H02J 7/045* (2013.01); *H02J 7/345* (2013.01);
(Continued)

(58) Field of Classification Search
CPC ............ H02J 7/025; H02J 7/045; H02J 7/345; H02M 3/155
(Continued)

(56) References Cited

U.S. PATENT DOCUMENTS 3,582,942 A * 6/1971 Carter, Jr. et al. ...... B61L 3/121
324/111
5,397,974 A * 3/1995 Tamai ................... H02J 7/0031
320/164
(Continued)

FOREIGN PATENT DOCUMENTS

CN       101026316 A       8/2007
CN       101324800 A       12/2008
(Continued)

OTHER PUBLICATIONS

Supplementary European Search Report in European application No. 13807071.9, dated May 30, 2016.
(Continued)

*Primary Examiner* — Sun Lin
(74) *Attorney, Agent, or Firm* — Oppedahl Patent Law Firm LLC

(57) ABSTRACT

A charging device is disclosed herein, the charging device comprises: a charging circuit, an energy storage circuit and a control switch, wherein the charging circuit is configured to charge an object to be charged, the energy storage circuit is configured to store energy when the charging circuit is charging the object to be charged and to charge the object to be charged when the charging circuit is in a switch-off state, and the control switch is configured to alternately switch on and switch off the charging circuit according to control commands received periodically, to switch off the energy storage circuit when the charging circuit is switched on and to switch on the energy storage circuit when the charging circuit is switched off. A charging method of the charging
(Continued)

device is also disclosed. Technical solution disclosed herein can be applied to improve charging efficiency of a charging device thereby enhancing utilization of the charging device.

7 Claims, 4 Drawing Sheets

(51) Int. Cl.
*H02M 3/155* (2006.01)
*H02J 7/34* (2006.01)
*H02J 7/00* (2006.01)

(52) U.S. Cl.
CPC ....... *H02J 2007/0062* (2013.01); *Y02B 40/90* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 5,402,056 A | * | 3/1995 | Ketterling | H02J 9/061 320/140 |
| 5,563,495 A | * | 10/1996 | Tomiyori | H02J 7/008 320/153 |
| 6,160,389 A | * | 12/2000 | Watts | H02M 3/1563 320/107 |
| 7,622,898 B2 | | 11/2009 | Kim | |
| 7,847,520 B2 | * | 12/2010 | Veselic et al. | H02J 7/0068 307/152 |
| 7,906,940 B2 | * | 3/2011 | Veselic et al. | H02J 7/0068 307/152 |
| 8,030,900 B2 | * | 10/2011 | Hussain et al. | H02J 7/0057 320/135 |
| 9,493,088 B2 | * | 11/2016 | Wei et al. | B60L 11/1816 |
| 2007/0194759 A1 | | 8/2007 | Shimizu | |
| 2008/0054855 A1 | | 3/2008 | Hussain | |
| 2008/0309291 A1 | | 12/2008 | Cha | |
| 2011/0298426 A1 | | 12/2011 | Hussain | |

FOREIGN PATENT DOCUMENTS

| | | |
|---|---|---|
| CN | 201549907 U | 8/2010 |
| CN | 102820775 A | 12/2012 |
| CN | 102946122 A | 2/2013 |
| JP | 2007221958 A | 8/2007 |
| KR | 20080109497 A | 12/2008 |
| RU | 18026 | 5/2001 |
| SU | 799077 A1 | 1/1981 |
| WO | 2008030398 A2 | 3/2008 |

OTHER PUBLICATIONS

International Search Report in international application No. PCT/CN2013/081230, dated Feb. 27, 2014.

English Translation of the Written Opinion of the International Search Authority in international application No. PCT/CN2013/081230, dated Feb. 27, 2014.

\* cited by examiner

CHARGING DEVICE AND CHARGING METHOD

TECHNICAL FIELD

The disclosure relates to the charging technology of electronic devices, and in particular to a charging device and a charging method.

BACKGROUND

The charging function of a Universal Serial Bus (USB) is to charge a terminal through a USB port of a Personal Computer (PC) or laptop. At present, many handheld devices such as MP3, mobile phone and the like all are provided with a USB charger; a data line, as a power line, is inserted into the USB port of the PC or laptop to automatically charge a terminal, which makes people's life much more convenient. The charging process includes three charging stages: constant voltage charging, constant current charging and tiny-current charging.

Generally, the output voltage from the USB port of a PC or laptop is 5V, which is relatively precise; however, the output current from the USB port is small and a tiny-current charging is needed at the final stage of the charging process. The tiny-current charging is to compensate the capacity loss caused by self-discharge of a battery after the battery is fully charged. After a battery is fully charged, the capacity loss caused by self-discharge generally is 5% of the nominal capacity. Theoretically, the capacity loss caused by self-discharge can be compensated by continuous charging of C/500 current. However, since the tiny-current is too small, the tiny-current charging process is very slow, which then prolongs the charging time and reduces the charging efficiency.

FIG. 1 is a schematic circuit diagram of charging through a USB interface in the related art; in actual applications, during the charging process of electronic devices, generally current is limited to 400 mA, total power input is 2 W, the voltage output from a Metal-Oxide-Semiconductor Field Effect Transistor (MOSFET) is lowered to a certain voltage range by the battery of the electronic device, generally the voltage range is between 3.6V and 4.3V, at this time the power output is between 1.44 W and 1.72 W, and the current is lower than 400 mA when the voltage is close to 4.3V; therefore, during the tiny-current charging process, the MOSFET used for limiting current consumes power; how to improve the charging efficiency of the tiny-current charging stage is a problem to be solved.

SUMMARY

To achieve the above purpose, the technical solution of the embodiment of the disclosure is implemented as follows.

In view of the above, the embodiment of the disclosure mainly aims at providing a charging device and a charging method, which can improve the charging efficiency.

To achieve the above purpose, the technical solution of the embodiment of the disclosure is implemented as follows.

An embodiment of the disclosure provides a charging device, including: a charging circuit, an energy storage circuit and a control switch, wherein the charging circuit is configured to charge an object to be charged;

the energy storage circuit is configured to store energy when the charging circuit is charging the object to be charged, and to charge the object to be charged when the charging circuit is in a switch-off state; and the control switch is configured to alternately switch on and switch off the charging circuit according to control commands received periodically, to switch off the energy storage circuit when the charging circuit is switched on, and to switch on the energy storage circuit when the charging circuit is switched off.

Preferably, the energy storage circuit may include an energy storage filter inductor, an energy storage filter capacitor and a rectifier diode, wherein, one end of the energy storage filter capacitor is connected with one end of the energy storage filter inductor, other end of the energy storage filter capacitor is connected with a cathode of the charging source; other end of the energy storage filter inductor is connected with an anode of the charging source via the control switch, and is connected with the cathode of the charging source via the rectifier diode; the rectifier diode cuts off a direction from the anode to the cathode of the charging source.

Preferably, the control switch may be a transistor power switch;

the other end of the energy storage filter inductor being connected with the anode of the charging source via the control switch may include: the other end of the energy storage filter inductor is connected with a collector of the transistor power switch, and an emitter of the transistor power switch is connected with the anode of the charging source.

Preferably, the energy storage circuit storing energy may include:

when the transistor power switch is turned on, the energy storage filter inductor inhibits a current beyond a preset threshold from flowing through the energy storage filter inductor, and converts a current flowing through the energy storage filter inductor into magnetic energy to store; the energy storage filter capacitor converts partial current flowing through the energy storage filter inductor into charges to store;

the energy storage circuit charging the object to be charged may include:

when the transistor power switch is turned off, the energy storage filter inductor converts the stored magnetic energy into a current to continue to charge the object to be charged via the rectifier diode; the energy storage filter capacitor converts the stored charges into a current to continue to charge the object to be charged.

Preferably, the energy storage circuit may include: a current-limiting capacitor, a current-limiting resistor, a first energy storage capacitor, a second energy storage capacitor, a third energy storage capacitor, a first resistor, a second resistor, a third resistor, a first Zener diode, a second Zener diode, a first diode, a second diode, a transistor and a Metal-Oxide-Semiconductor Field Effect Transistor (MOSFET), wherein one end of the current-limiting capacitor is connected with one end of the control switch; other end of the current-limiting capacitor is connected with the current-limiting resistor and an anode of the first diode respectively; other end of the current-limiting resistor is connected with a cathode of the first Zener diode; an anode of the first Zener diode is connected with one end of the first resistor and one end of the transistor respectively; one end of the first resistor is connected with a cathode of the charging source; a cathode of the first diode is connected with one end of the first energy storage capacitor, one end of the second resistor, one end of the third resistor and a cathode of the second diode respectively; other end of the first energy storage capacitor is connected with the cathode of the charging source; a third end of the transistor is connected with the cathode of the charging source; a drain of the MOSFET is connected with one end of the third resistor; a source of the MOSFET is connected with one end of the second resistor and a cathode of the second Zener diode respectively; an anode of the second Zener diode is connected with the cathode of the charging source: a gate of the MOSFET is connected with an anode of the second diode, one end of the second energy storage capacitor and one end of the third energy storage capacitor respectively; other end of the second energy storage capacitor and other end of the third energy storage capacitor both are connected with the cathode of the charging source.

Preferably, the energy storage circuit storing energy may include:

when the control switch is turned on, the second energy storage capacitor and the third energy storage capacitor store charges by using a circuit formed by the second Zener diode, the second resistor, the third resistor and the MOSFET;

the energy storage circuit charging the object to be charged may include:

when the control switch is turned off, the second energy storage capacitor and the third energy storage capacitor charge the object to be charged by using a circuit formed by the second diode, the second resistor, the third resistor and the MOSFET.

An embodiment of the disclosure also provides a charging method applied to the above charging device, wherein the method includes:

alternately switching on and switching off, by a control switch, a charging circuit according to control commands received periodically; switching off, by the control switch, an energy storage circuit when the charging circuit is switched on; and switching on, by the control switch, the energy storage circuit when the charging circuit is switched off;

storing, by the energy storage circuit, energy when the charging circuit is charging an object to be charged, and charging, by the energy storage circuit, the object to be charged when the charging circuit is in a switch-off state.

Preferably, when the energy storage circuit may include an energy storage filter inductor, an energy storage filter capacitor and a rectifier diode, the storing energy by the energy storage circuit may include: when a transistor power switch is turned on, inhibiting, by the energy storage filter inductor, a current beyond a preset threshold from flowing through the energy storage filter inductor, and converting, by the energy storage filter inductor, a current flowing through the energy storage filter inductor into magnetic energy to store; converting, by the energy storage filter capacitor, partial current flowing through the energy storage filter inductor into charges to store;

the charging, by the energy storage circuit, the object to be charged may include: when the transistor power switch is turned off, converting, by the energy storage filter inductor, the stored magnetic energy into a current to continue to charge the object to be charged via the rectifier diode; converting, by the energy storage filter capacitor, the stored charges into a current to continue to charge the object to be charged.

Preferably, when the energy storage circuit may include: a current-limiting capacitor, a current-limiting resistor, a first energy storage capacitor, a second energy storage capacitor, a third energy storage capacitor, a first resistor, a second resistor, a third resistor, a first Zener diode, a second Zener diode, a first diode, a second diode, a transistor and a Metal-Oxide-Semiconductor Field Effect Transistor (MOSFET), the storing energy by the energy storage circuit may include: when the control switch is turned on, storing, by the second energy storage capacitor and the third energy storage capacitor, charges by using a circuit formed by the second Zener diode, the second resistor, the third resistor and the MOSFET;

the charging, by the energy storage circuit, the object to be charged may include: when the control switch is turned off, charging, by the second energy storage capacitor and the third energy storage capacitor, the object to be charged by using a circuit formed by the second diode, the second resistor, the third resistor and the MOSFET.

In the charging device and the charging method provided by the embodiment of the disclosure, the control switch alternately switches on and switches off a charging circuit according to control commands received periodically, switches off an energy storage circuit when the charging circuit is switched on and switches on the energy storage circuit when the charging circuit is switched off; the energy storage circuit stores energy when the charging circuit is charging an object to be charged, and the energy storage circuit charges the object to be charged when the charging circuit is in a switch-off state. In this way, based on the principle of storing energy and releasing energy to reduce voltage and through the modification of circuit, the embodiment of the disclosure shortens the charging time of the tiny-current charging, improves the charging efficiency of the tiny-current charging, and hereby shortens the total charging time of the three charging stages including the constant-voltage charging, the constant-current charging and the tiny-current charging, improves the charging efficiency and improves user experience. In addition, the device provided in the embodiment of the disclosure can be set in an electronic device to charge the rechargeable battery inside the electronic device, wherein the electronic device may be an MP3, a mobile hone and other handheld devices, a portable power source, a charger and other charging devices.

DETAILED DESCRIPTION

The disclosure is described below in further detail in conjunction with the accompanying drawings and specific embodiments.

Figure 1:
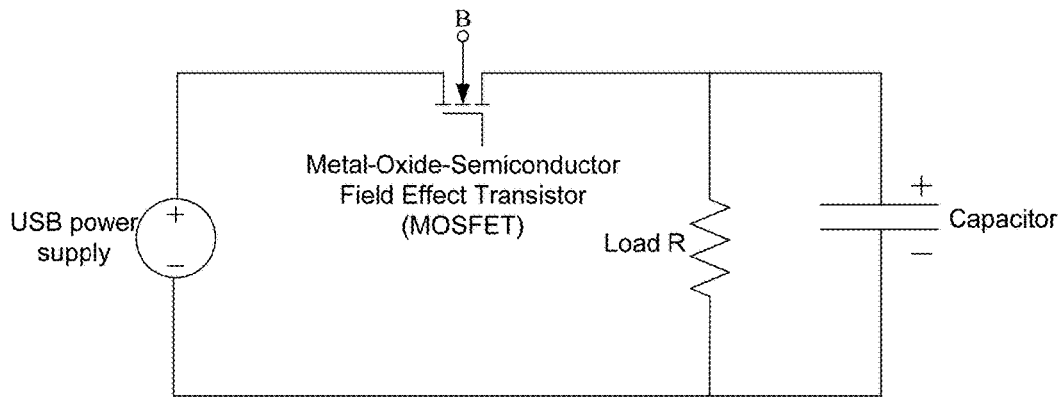
FIG. 1 is a schematic circuit diagram of charging through a USB interface in the related art.
Figure 2:
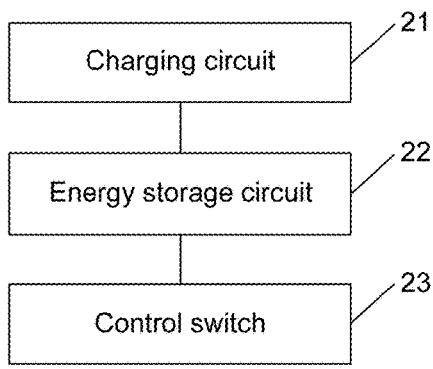
FIG. 2 is a structure diagram of a charging device according to an embodiment of the disclosure.

FIG. 2 is a structure diagram of a charging device according to an embodiment of the disclosure; as shown in FIG. 2, the device includes a charging circuit 21, an energy storage circuit 22 and a control switch 23, wherein the charging circuit 21 is configured to charge an object to be charged;

the energy storage circuit 22 is configured to store energy when the charging circuit 21 is charging the object to be charged, and to charge the object to be charged when the charging circuit 21 is in a switch-off state; and the control switch 23 is configured to alternately switch on and switch off the charging circuit 21 according to control commands received periodically, to switch off the energy storage circuit 22 when the charging circuit 21 is switched on, and to switch on the energy storage circuit 22 when the charging circuit 21 is switched off.

Specifically, a USB port of a PC or laptop supplies voltage to the device.

Here, the control switch may be controlled by a programmable chip.

Here, the device is set in an electronic device to charge a rechargeable battery inside the electronic device.

Figure 3:
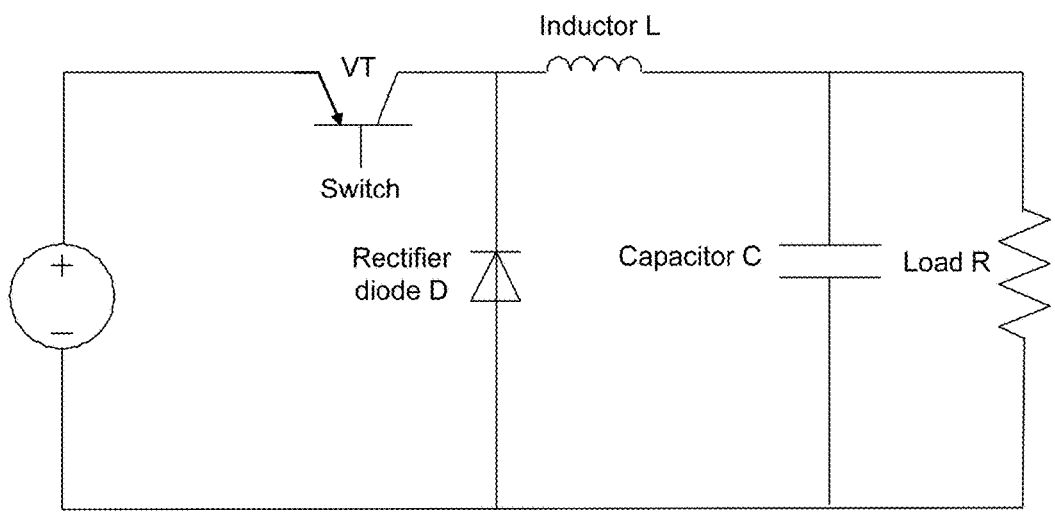
FIG. 3 is a schematic circuit diagram of a charging device according to an embodiment of the disclosure.

FIG. 3 is a schematic circuit diagram of a charging device according to an embodiment of the disclosure; as shown in FIG. 3, the energy storage circuit in the circuit includes an energy storage filter inductor L, an energy storage filter capacitor C and a rectifier diode D, in which, one end of the energy storage filter capacitor C is connected with one end of the energy storage filter inductor L, the other end of the energy storage filter capacitor is connected with a cathode of a charging source; the other end of the energy storage filter inductor L is connected with an anode of the charging source via the control switch, and is connected with the cathode of the charging source via the rectifier diode; the rectifier diode cuts off the direction from the anode to the cathode of the charging source.

Here, the control switch may be a transistor power switch VT; the charging source may be 5V-voltage supplied by the USB port of the PC or laptop.

Specifically, the other end of the energy storage filter inductor L being connected with the anode of the charging source via the control switch includes:

the other end of the energy storage filter inductor L is connected with a collector of the transistor power switch VT, and an emitter of the transistor power switch VT is connected with the anode of the charging source.

The energy storage circuit storing energy includes:

when the transistor power switch VT is turned on, the energy storage filter inductor L inhibits a current beyond a preset threshold from flowing through the energy storage filter inductor L, and converts a current flowing through the energy storage filter inductor L into magnetic energy to store; the energy storage filter capacitor C converts partial current flowing through the energy storage filter inductor L into charges to store;

the energy storage circuit charging the object to be charged includes:

when the transistor power switch VT is turned off, the energy storage filter inductor L converts the stored magnetic energy into a current to continue to charge the object to be charged via the rectifier diode; the energy storage filter capacitor C converts the stored charges into a current to continue to charge the object to be charged.

Preferably, the frequency of the transistor power switch VT is 20 MHz.

Here, when the transistor power switch VT is conducted, the energy storage filter inductor L limits the flow-through of a big current, so as to prevent voltage from being directly added to the object to be charged when the switch is conducted, also to prevent voltage from being directly added to a load R when the switch is conducted.

Here, the object to be charged generally refers to a rechargeable battery, equivalent to the load R in FIG. 3.

Here, when the transistor power switch VT is turned off, the rectifier diode D functions as a follow current, which releases energy and provides a current path for the energy storage filter inductor L.

Figure 4A:
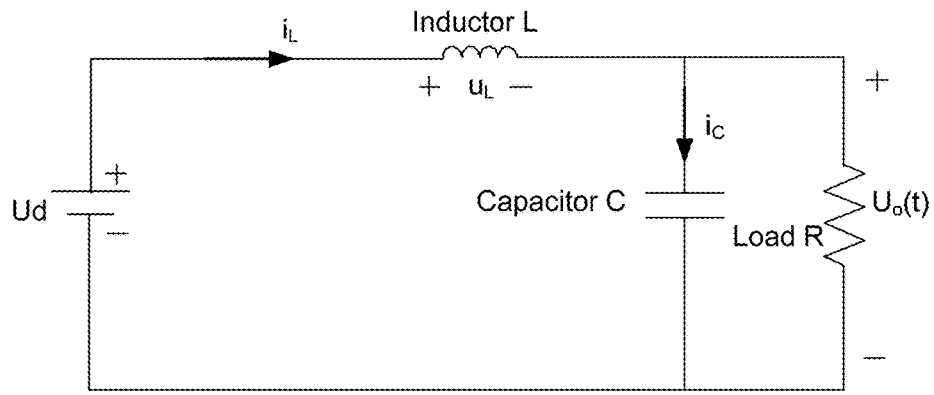
FIG. 4 is an equivalent circuit diagram of the schematic circuit diagram shown in FIG. 3 according to an embodiment of the disclosure.
Figure 4B:
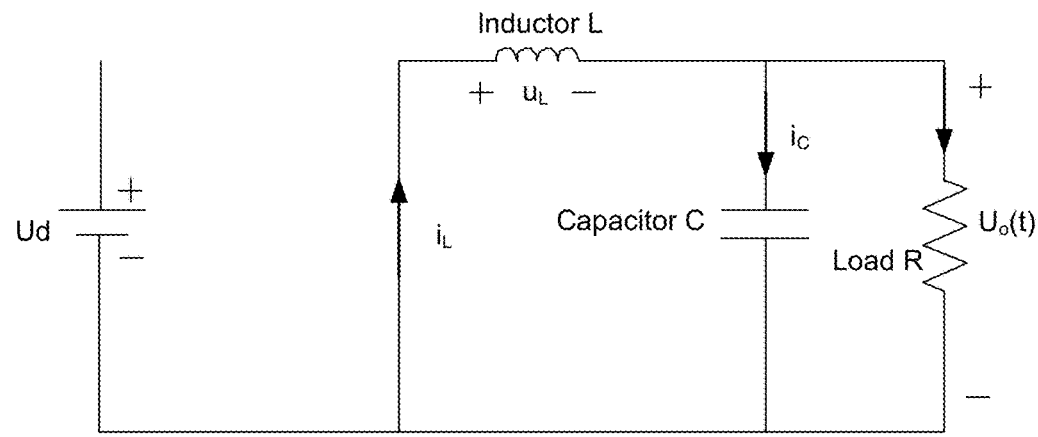
Figure 4C:
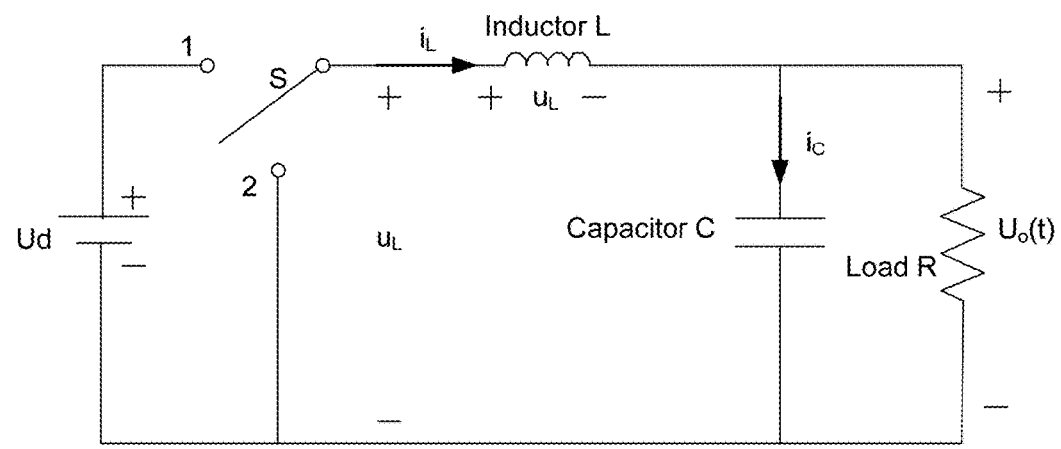

FIG. 4 is an equivalent circuit diagram of the schematic circuit diagram shown in FIG. 3 according to an embodiment of the disclosure; FIG. 4(a) is an equivalent circuit diagram in the condition that the transistor power switch VT is conducted; FIG. 4(b) is an equivalent circuit diagram in the condition that the transistor power switch VT is turned off; FIG. 4(c) is an overall equivalent circuit diagram of the schematic circuit diagram shown in FIG. 3.

Hereinafter, the schematic circuit diagram shown in FIG. 3 is described in conjunction with the equivalent circuit diagram shown in FIG. 4 and the voltage and current waveform diagram shown in FIG. 5. For a convenient description, the capacitor referred as follows is an energy storage filter capacitor and the inductor referred as follows is an energy storage filter inductor.

(1) During the period of controlling the turn-off of the transistor power switch VT, an inductor L will generate a counter electromotive force; a current $i_L$ flowing through the inductor L flows out from an anode of the counter electromotive force, flows through an anode of the rectifier diode D after passing through the load R, and then flows out from a cathode of the rectifier diode D, and finally returns to a cathode of the counter electromotive force; the equivalent circuit enables a pulsating DC voltage to output an average value after smoothing filtering, so as to achieve the effect of voltage reduction.

(2) From FIG. 4(c) it can seen that an inductor L and a capacitor C compose a low-pass filter; the design principle of the low-pass filter is to enable the pass of the DC component of us(t) and to inhibit the pass of the harmonic component of us(t); the output voltage $U_0$ of the capacitor is the DC component of us(t) plus a tiny uripple (t). Since the working frequency of the circuit is high, the uripple(t) caused by the charge-discharge of the capacitor is small in a switch period; compared with the DC voltage $U_0$ output by the capacitor, $|uripple(t)| \ll U_o$; therefore, the voltage output by the capacitor may be viewed as constant, which meets the ripple approximation principle in the switch circuit steady-state analysis in the related art.

(3) The transient process of voltage adjustment on a capacitor is that: during a period, if a charging charge is higher than a discharging charge of the capacitor, the voltage of the capacitor is increased, resulting in a reduction of charging charge and an increase of discharging charge in following periods, thereby enabling a slow increase of voltage on the capacitor; this process lasts until a charge-discharge balance is realized, at this time, the voltage maintains unchanged; otherwise, if during a period the discharging charge is higher than the charging charge, it results in an increase of charging charge and a reduction of discharging charge in following periods, thereby enabling a slow reduction of voltage on the capacitor; this process lasts until a charge-discharge balance is realized, finally to maintain the voltage unchanged; that is, to meet the general law of charge-discharge balance on a capacitor when the circuit is in a steady-state operation.

(4) When an equivalent switch S is placed at an end 1, an inductor current is increased and the inductor stores energy; when the switch S is placed at an end 2, the inductor current is reduced and the inductor releases energy. Supposing the current increment is greater than the current decrement, then in a switch period the magnetic linkage increment $\Delta\psi=L(\Delta i)$ is greater than 0 on the inductor; this increment will generate an average induced electromotive force $u=\Delta\psi/T$ which is greater than 0; this average induced electromotive force will reduce the increase speed of the inductor current and meanwhile reduce the decrease speed of the inductor current, and finally will result in a zero average increment of inductor current in a period; similarly, if in a switch period the magnetic linkage increment $\Delta\psi=L(\Delta i)$ is less than 0 on the inductor, a zero average increment of inductor current in a period will be finally caused. In a steady state, the average increment of inductor current in a period is zero, that is, the magnetic linkage average increment is zero, which meets the induction volt-second balance principle.

(5) Supposing 0 to $t_2$ to be a period, and 0 to $t_1$ to be the conduction period of the transistor power switch VT, $t_1$ to $t_2$ to be the turn-off period of the transistor power switch VT, the steady-state operation of the inductor current in a Continuous Conduction Mode (CCM) is as follows:

(1) The Conducting State of the Transistor Power Switch VT ($0 \le t \le t_1 = dt$)

When the equivalent switch S is connected with the end 1, that is, when the transistor power switch VT is conducted, a following formula is obtained according to the equivalent circuit shown in FIG. 4(a):

$$u_L = U_d - U_o = L(di_L/dt), \text{ and } u_{VT} \approx 0;$$

where $u_{VT}$ represents a voltage of the transistor power switch VT, $U_d$ represents a voltage supplied by an external charging source; generally, the external charging source refers to an output voltage from the USB port of a PC or laptop, $U_d$ is generally 5V; $U_0$ represents an output voltage from the capacitor.

Figure 5:
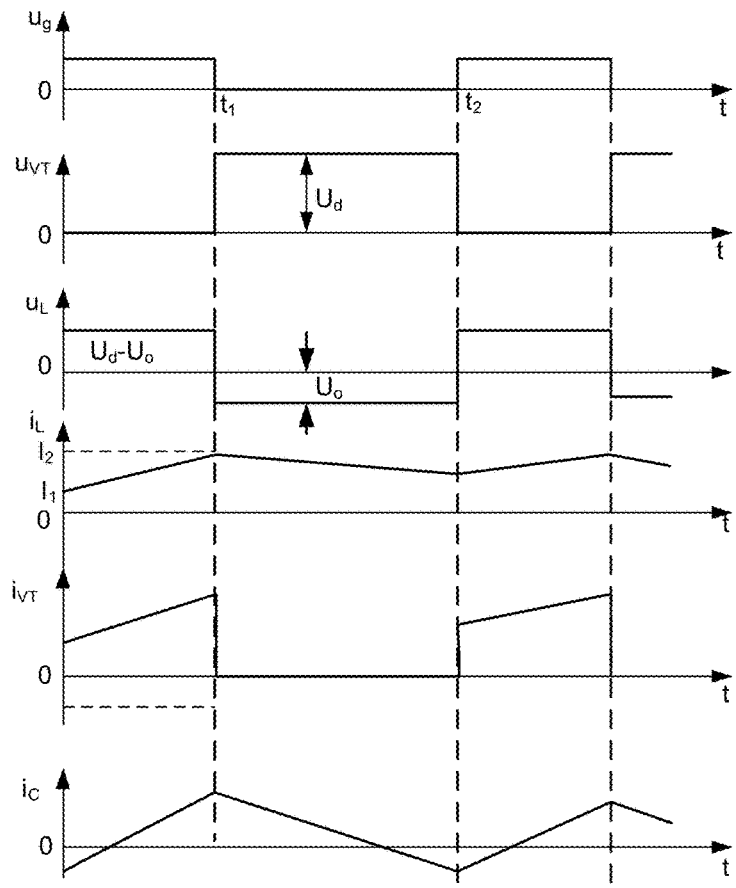
FIG. 5 is a current and voltage waveform diagram of the schematic circuit diagram shown in FIG. 3 according to an embodiment of the disclosure.

Since the working frequency of the circuit is very high, during one period $U_d$ and $U_0$ basically maintain unchanged, which can be viewed as a constant value, that is, ($U_d-U_o$) can be viewed as a constant, then the current is changing in a linear trend; the voltage change diagram of $u_L$ and $u_{VT}$ is as shown in FIG. 5.

According to $u_L = U_d - U_o = L(di_L/dt)$, and $u_{VT} \approx 0$, following formulas are obtained:

$$u_L = U_d - U_o = L(I_2 - I_1)/\Delta t = L(\Delta I_L/dt);$$

$$\Delta I_L = (U_d - U_o)t_1/L;$$

$$i_{VT} = i_L;$$

$$i_C = i_L - i_o = i_L - U_o/R;$$

where $i_0$ is constant, $i_C$ and $i_L$ have the same slope, $i_{VT}$ represents a current of the transistor power switch VT, $i_C$ represents a current of the capacitor C, $i_L$ represents a current of the inductor L, $i_0$ represents a current of the load R, the current change diagram of $i_C$, $i_L$ and $i_{VT}$ is as shown in FIG. 5.

(2) The Turn-Off State of the Transistor Power Switch VT ($t_1 < t \le t_2$)

When the equivalent switch S is connected with the end 2, that is, when the transistor power switch VT is turned off, the rectifier diode VD is conducted; a following formula is obtained according to the equivalent circuit shown in FIG. 4(b):

$$u_L = -U_o = L(di/dt), \text{ and } u_{VT} \approx U_d.$$

Similarly, since $U_0$ is viewed as basically unchanged, following formulas are obtained:

$$-U_o = L(di_L/dt) = L\Delta I_L/(t_2 - t_1);$$

$$\Delta I_L = -U_o(t_2 - t_1)/L;$$

$$i_{VT} = 0;$$

$$i_C = i_L - i_o = i_L - U_o/R;$$

where $i_0$ is constant, $i_C$ and $i_L$ have the same slope, the voltage change of $u_L$ and $u_{VT}$ and the current change of $i_C$, $i_L$ and $i_{VT}$ are as shown in FIG. 5.

To sum up, $i_C$ can be increased by the reduction of $U_0$. A programmable control chip controls $U_0$ by controlling the turn-on time and turn-off time of the transistor power switch, so as to achieve the effect of reducing charging voltage and increasing charging current, thereby improving the charging efficiency.

Figure 6:
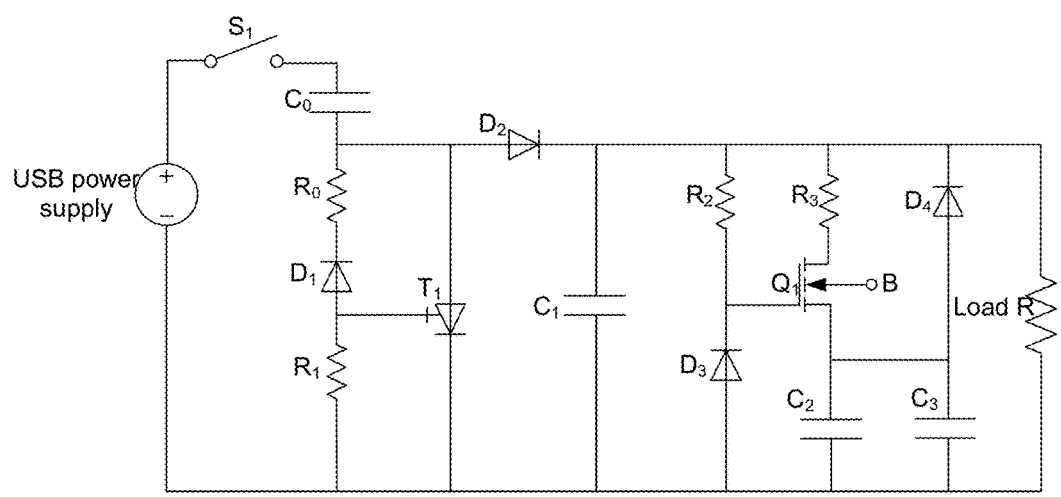
FIG. 6 is another schematic circuit diagram of a charging device according to an embodiment of the disclosure.

According to the principle of energy storage and energy release, an embodiment of the disclosure also provides another schematic circuit diagram of a charging device, as shown in FIG. 6, the energy storage circuit of the circuit includes: a current-limiting capacitor $C_0$, a current-limiting resistor $R_0$, a first energy storage capacitor $C_1$, a second energy storage capacitor $C_2$, a third energy storage capacitor $C_3$, a first resistor $R_1$, a second resistor $R_2$, a third resistor $R_3$, a first Zener diode $D_1$, a first diode $D_2$, a second Zener diode $D_3$, a second diode $D_4$, a transistor $T_1$ and an MOSFET, in which, one end of the current-limiting capacitor $C_0$ is connected with one end of the control switch $S_1$; the other end of the current-limiting capacitor $C_0$ is connected with the current-limiting resistor $R_0$ and an anode of the first diode $D_2$ respectively; the other end of the current-limiting resistor $R_0$ is connected with a cathode of the first Zener diode $D_1$; an anode of the first Zener diode $D_1$ is connected with one end of the first resistor $R_1$ and one end of the transistor $T_1$ respectively; one end of the first resistor $R_1$ is connected with a cathode of the charging source; a cathode of the first diode $D_1$ is connected with one end of the first energy storage capacitor $C_1$, one end of the second resistor $R_2$, one end of the third resistor $R_3$ and a cathode of the second diode $D_4$ respectively; the other end of the energy storage capacitor $C_1$ is connected with the cathode of the charging source; the third end of the transistor $T_1$ is connected with the cathode of the charging source; a drain of the MOSFET is connected with one end of the third resistor $R_3$; a source of the MOSFET is connected with one end of the second resistor $R_2$ and a cathode of the second Zener diode $D_3$ respectively; an anode of the second Zener diode $D_3$ is connected with the cathode of the charging source: a gate of the MOSFET is connected with an anode of the second diode $D_4$, one end of the second energy storage capacitor $C_2$ and one end of the third energy storage capacitor $C_3$ respectively; the other end of the second energy storage capacitor $C_2$ and the other end of the third energy storage capacitor $C_3$ both are connected with the cathode of the charging source.

Specifically, the energy storage circuit storing energy includes:

when the control switch $S_1$ is turned on, the second energy storage capacitor $C_2$ and the third energy storage capacitor $C_3$ store charges by using a circuit formed by the second Zener diode $D_3$, the second resistor $R_2$, the third resistor $R_3$ and the MOSFET;

the energy storage circuit charging the object to be charged includes:

when the control switch $S_1$ is turned off, the second energy storage capacitor $C_2$ and the third energy storage capacitor $C_3$ charge the object to be charged by using a circuit formed by the second diode $D_4$, the second resistor $R_2$, the third resistor $R_3$ and the MOSFET.

Here, the control switch $S_1$ may be a transistor power switch.

Specifically, when the control switch $S_1$ is conducted, $C_0$ and $R_0$ limit the main circuit to flow in the current of a control circuit board, so as to prevent an excessive current from damaging elements in the energy storage circuit; when the voltage of the energy storage capacitor reaches a needed voltage, the transistor $T_1$ is conducted, the current of the by-pass main circuit maintains the work of the control circuit board by means of the energy in the energy storage capacitor, until the main circuit power supply charges the energy storage circuit in a next period; $D_3$ together with $R_2$, $R_3$ and MOSFET forms a charging circuit of capacitors $C_2$ and $C_3$; $D_4$ is a diode used for the discharge of the energy storage capacitors $C_2$ and $C_3$; in FIG. 6, MOSFET is represented by $Q_1$; $C_1$ is a metallized polyester film capacitor; $C_2$ and $C_3$ both are aluminium electrolytic capacitors; the capacity of the capacitor can be set according to specific conditions.

When the control circuit board works normally, $C_1$ is charged once each period; the energy stored in the capacitor $C_1$ is enough to maintain the charge of a load; however, when the main circuit $S_1$ is closed, voltage is reduced to 0V, the main circuit can not charge the energy storage capacitor, and at this time $C_1$, $C_2$ and $C_3$ continue to charge the load.

By the energy storage and energy release mode of the above circuit, the charging voltage can reduced and the charging current can be increased, thus charging efficiency can be improved.

Figure 7:
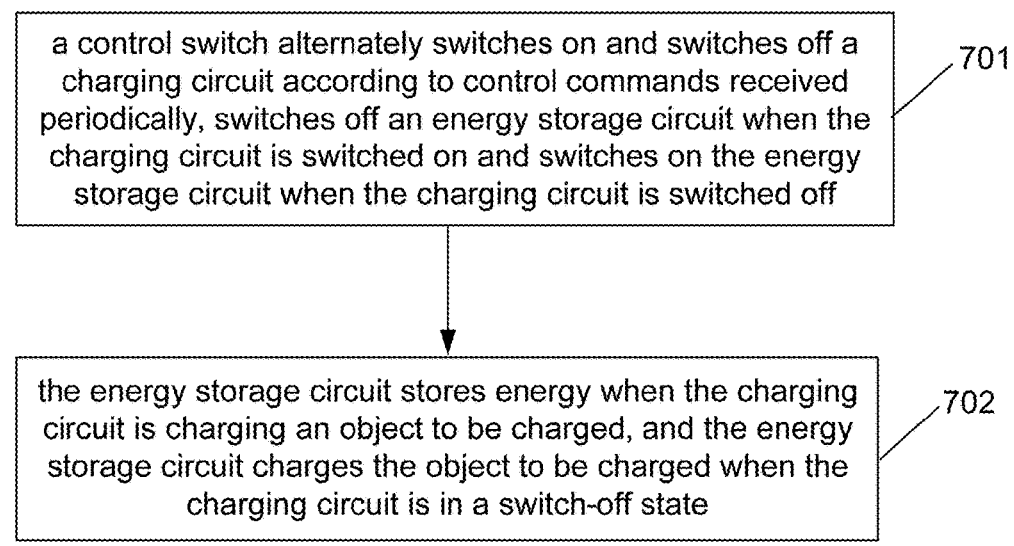
FIG. 7 is an implementation flowchart of a charging method according to an embodiment of the disclosure.

FIG. 7 is an implementation flowchart of a charging method according to an embodiment of the disclosure. As shown in FIG. 7, the method includes following steps:

Step 701: a control switch alternately switches on and switches off a charging circuit according to control commands received periodically, switches off an energy storage circuit when the charging circuit is switched on, and switches on the energy storage circuit when the charging circuit is switched off.

Step 702: the energy storage circuit stores energy when the charging circuit is charging an object to be charged, and the energy storage circuit charges the object to be charged when the charging circuit is in a switch-off state.

Preferably, when the energy storage circuit includes an energy storage filter inductor, an energy storage filter capacitor and a rectifier diode;

the energy storage circuit storing energy includes: when a transistor power switch is turned on, the energy storage filter inductor inhibits a current beyond a preset threshold from flowing through the energy storage filter inductor, and converts a current flowing through the energy storage filter inductor into magnetic energy to store; the energy storage filter capacitor converts partial current flowing through the energy storage filter inductor into charges to store;

the energy storage circuit charging the object to be charged includes: when the transistor power switch is turned off, the energy storage filter inductor converts the stored magnetic energy into a current to continue to charge the object to be charged via the rectifier diode; the energy storage filter capacitor converts the stored charges into a current to continue to charge the object to be charged.

Preferably, when the energy storage circuit includes: a current-limiting capacitor, a current-limiting resistor, a first energy storage capacitor, a second energy storage capacitor, a third energy storage capacitor, a first resistor, a second resistor, a third resistor, a first Zener diode, a second Zener diode, a first diode, a second diode, a transistor and an MOSFET, the energy storage circuit storing energy includes: when the control switch is turned on, the second energy storage capacitor and the third energy storage capacitor store charges by using a circuit formed by the second Zener diode, the second resistor, the third resistor and the MOSFET;

the energy storage circuit charging the object to be charged includes: when the control switch is turned off, the second energy storage capacitor and the third energy storage capacitor charge the object to be charged by using a circuit formed by the second diode, the second resistor, the third resistor and the MOSFET.

The above are only preferred embodiments of the disclosure and are not intended to limit the scope of protection of the disclosure. Any modification, equivalent substitute and improvement made within the spirit and principle of the disclosure are deemed to be included within the scope of protection of the disclosure.

INDUSTRIAL APPLICABILITY

In an embodiment of the disclosure, a control switch alternately switches on and switches off a charging circuit according to control commands received periodically, switches off an energy storage circuit when the charging circuit is switched on, and switches on the energy storage circuit when the charging circuit is switched off; the energy storage circuit stores energy when the charging circuit is charging an object to be charged, and the energy storage circuit charges the object to be charged when the charging circuit is in a switch-off state; thus, charging efficiency is improved and user experience is improved.

What is claimed is:

1. A charging device, comprising: a charging circuit, an energy storage circuit and a control switch, wherein
   the charging circuit is configured to charge an object to be charged;
   the energy storage circuit is configured to store energy when the charging circuit is charging the object to be charged, and to charge the object to be charged when the charging circuit is in a switch-off state; and
   the control switch is configured to alternately switch on and switch off the charging circuit according to control commands received periodically, to switch off the energy storage circuit when the charging circuit is switched on, and to switch on the energy storage circuit when the charging circuit is switched off;
   wherein the energy storage circuit comprises an energy storage filter inductor, an energy storage filter capacitor and a rectifier diode, wherein,
   one end of the energy storage filter capacitor is connected with one end of the energy storage filter inductor, another end of the energy storage filter capacitor is connected with a cathode of a charging source; another end of the energy storage filter inductor is connected with an anode of the charging source via the control switch, and is connected with the cathode of the charging source via the rectifier diode; the rectifier diode cuts off a direction of a current flowing from the anode to the cathode of the charging source.

2. The charging device according to claim 1, wherein the control switch is a transistor power switch;
the another end of the energy storage filter inductor being connected with the anode of the charging source via the control switch comprises: the another end of the energy storage filter inductor is connected with a collector of the transistor power switch, and an emitter of the transistor power switch is connected with the anode of the charging source.

3. The charging device according to claim 2, wherein the energy storage circuit storing energy comprises:
when the transistor power switch is turned on, the energy storage filter inductor inhibits a current beyond a preset threshold from flowing through the energy storage filter inductor, and converts a current flowing through the energy storage filter inductor into magnetic energy to store; the energy storage filter capacitor converts a partial current flowing through the energy storage filter inductor into charges to store;
the energy storage circuit charging the object to be charged comprises:
when the transistor power switch is turned off, the energy storage filter inductor converts the stored magnetic energy into a current to continue to charge the object to be charged via the rectifier diode; the energy storage filter capacitor converts the stored charges into a current to continue to charge the object to be charged.

4. A charging device, comprising: a charging circuit, an energy storage circuit and a control switch, wherein
the charging circuit is configured to charge an object to be charged;
the energy storage circuit is configured to store energy when the charging circuit is charging the object to be charged, and to charge the object to be charged when the charging circuit is in a switch-off state; and
the control switch is configured to alternately switch on and switch off the charging circuit according to control commands received periodically, to switch off the energy storage circuit when the charging circuit is switched on, and to switch on the energy storage circuit when the charging circuit is switched off;
wherein the energy storage circuit comprises: a current-limiting capacitor, a current-limiting resistor, a first energy storage capacitor, a second energy storage capacitor, a third energy storage capacitor, a first resistor, a second resistor, a third resistor, a first Zener diode, a second Zener diode, a first diode, a second diode, a transistor and a Metal-Oxide-Semiconductor Field Effect Transistor (MOSFET), wherein
one end of the current-limiting capacitor is connected with one end of the control switch; another end of the current-limiting capacitor is connected with one end of the current-limiting resistor, an anode of the first diode and a first end of the transistor; another end of the current-limiting resistor is connected with a cathode of the first Zener diode; an anode of the first Zener diode is connected with one end of the first resistor and a second end of the transistor respectively; another end of the first resistor is connected with a cathode of the charging source; a cathode of the first diode is connected with one end of the first energy storage capacitor, one end of the second resistor, one end of the third resistor and a cathode of the second diode respectively; another end of the first energy storage capacitor is connected with the cathode of the charging source; a third end of the transistor is connected with the cathode of the charging source; a drain of the MOSFET is connected with one end of the third resistor; a source of the MOSFET is connected with one end of the second resistor and a cathode of the second Zener diode respectively; an anode of the second Zener diode is connected with the cathode of the charging source; a gate of the MOSFET is connected with an anode of the second diode, one end of the second energy storage capacitor and one end of the third energy storage capacitor respectively; another end of the second energy storage capacitor and another end of the third energy storage capacitor both are connected with the cathode of the charging source.

5. The charging device according to claim 4, wherein the energy storage circuit storing energy comprises:
when the control switch is turned on, the second energy storage capacitor and the third energy storage capacitor store charges by using a circuit formed by the second Zener diode, the second resistor, the third resistor and the MOSFET;
the energy storage circuit charging the object to be charged comprises:
when the control switch is turned off, the second energy storage capacitor and the third energy storage capacitor charge the object to be charged by using a circuit formed by the second diode, the second resistor, the third resistor and the MOSFET.

6. A charging method, comprising:
alternately switching on and switching off, by a control switch, a charging circuit according to control commands received periodically; switching off, by the control switch, an energy storage circuit when the charging circuit is switched on; and switching on, by the control switch, the energy storage circuit when the charging circuit is switched off;
storing, by the energy storage circuit, energy when the charging circuit is charging an object to be charged, and charging, by the energy storage circuit, the object to be charged when the charging circuit is in a switch-off state;
wherein when the energy storage circuit comprises an energy storage filter inductor, an energy storage filter capacitor and a rectifier diode,
the storing energy by the energy storage circuit comprises: when a transistor power switch is turned on, inhibiting, by the energy storage filter inductor, a current beyond a preset threshold from flowing through the energy storage filter inductor, and converting, by the energy storage filter inductor, a current flowing through the energy storage filter inductor into magnetic energy to store; converting, by the energy storage filter capacitor, partial current flowing through the energy storage filter inductor into charges to store;
the charging, by the energy storage circuit, the object to be charged comprises: when the transistor power switch is turned off, converting, by the energy storage filter inductor, the stored magnetic energy into a current to continue to charge the object to be charged via the rectifier diode; converting, by the energy storage filter capacitor, the stored charges into a current to continue to charge the object to be charged.

7. A charging method, comprising:
alternately switching on and switching off, by a control switch, a charging circuit according to control commands received periodically; switching off, by the control switch, an energy storage circuit when the charging circuit is switched on; and switching on, by the control switch, the energy storage circuit when the charging circuit is switched off;

storing, by the energy storage circuit, energy when the charging circuit is charging an object to be charged, and charging, by the energy storage circuit, the object to be charged when the charging circuit is in a switch-off state;

wherein when the energy storage circuit comprises: a current-limiting capacitor, a current-limiting resistor, a first energy storage capacitor, a second energy storage capacitor, a third energy storage capacitor, a first resistor, a second resistor, a third resistor, a first Zener diode, a second Zener diode, a first diode, a second diode, a transistor and a Metal-Oxide-Semiconductor Field Effect Transistor (MOSFET), the storing energy by the energy storage circuit comprises: when the control switch is turned on, storing, by the second energy storage capacitor and the third energy storage capacitor, charges by using a circuit formed by the second Zener diode, the second resistor, the third resistor and the MOSFET;

the charging, by the energy storage circuit, the object to be charged comprises: when the control switch is turned off, charging, by the second energy storage capacitor and the third energy storage capacitor, the object to be charged by using a circuit formed by the second diode, the second resistor, the third resistor and the MOSFET.

* * * * *